May 17, 1966 J. D. HUGHSON 3,251,989
MODULATED CARRIER FREQUENCY INDICATION SYSTEM
FOR IDENTIFIED VEHICLES
Filed Dec. 28, 1961 2 Sheets-Sheet 1

INVENTOR.
J. D. HUGHSON
BY Forest B. Vititoe
HIS ATTORNEY

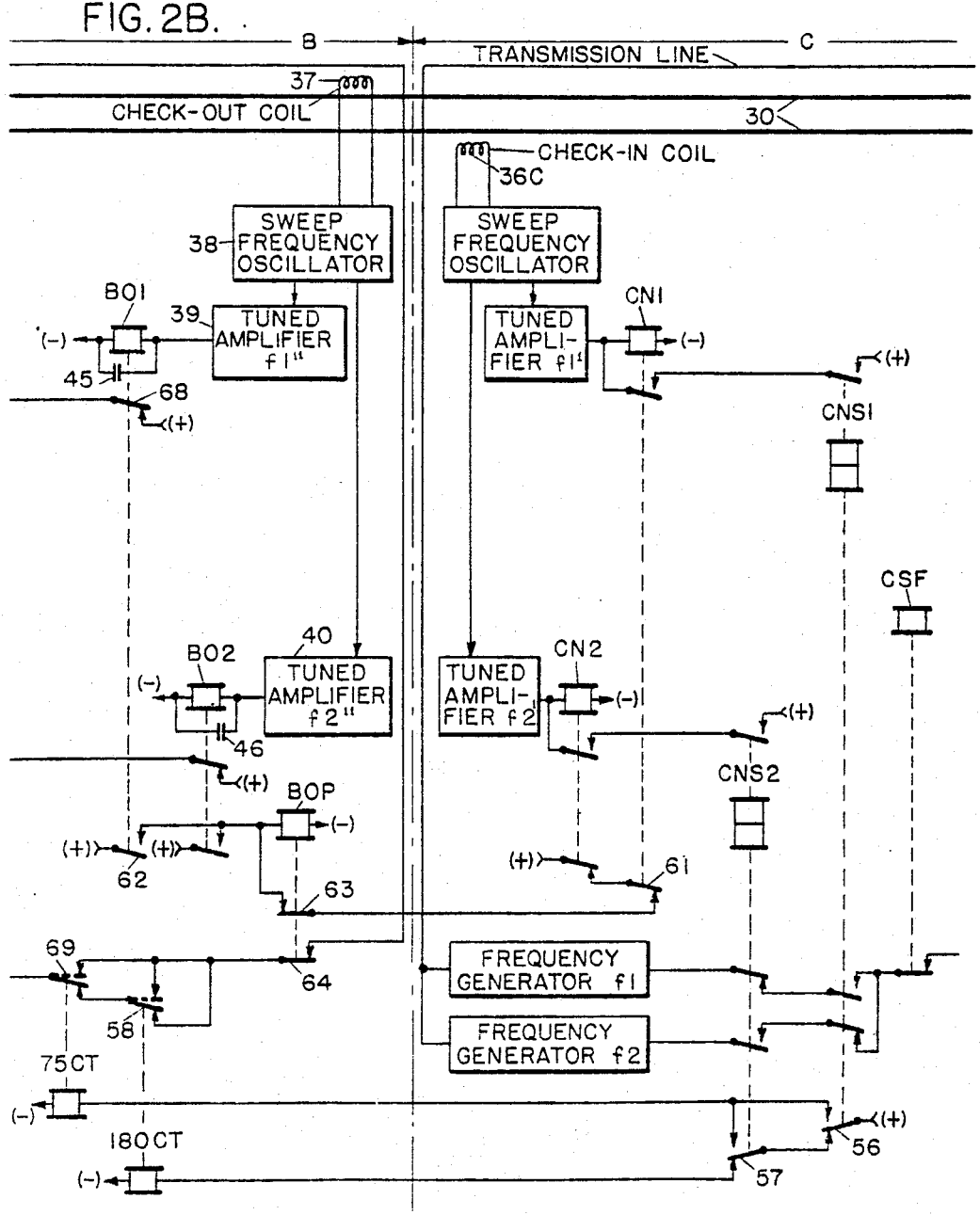

United States Patent Office 3,251,989
Patented May 17, 1966

3,251,989
MODULATED CARRIER FREQUENCY INDICATION SYSTEM FOR IDENTIFIED VEHICLES
J. Donald Hughson, Rochester, N.Y., assignor to
General Signal Corporation
Filed Dec. 28, 1961, Ser. No. 162,640
11 Claims. (Cl. 246—2)

This invention relates to an indication system, and more particularly pertains to a selective indication system for identified vehicles as they travel through defined zones so that the operator may determine from the character of the indication the occupancy condition of the zoned pathway ahead.

The identification of the vehicles is accomplished in this invention by the automatic selection of a carrier transmission frequency which corresponds to the identity of the vehicle. Various rates or types of modulation of the carrier frequency may be used, each being indicative of the occupancy condition of the zone ahead. When no modulation is present, the carrier is removed, thus nulling the emitted signal so that in the event of failure of either the carrier or the modulation the indicator on the vehicle responds to a most restrictive indication. If all of the circuits are functioning properly and if the zone ahead is occupied, a caution or less restrictive signal will be indicated. On the other hand, if the zone ahead is unoccupied a least restrictive signal will be indicated to the operator.

In the usual train control systems of the continuous inductive type alternating current interrupted pulses are transmitted through the rails for the control of trains, and/or the indication of cab signals. These pulses are received inductively on the locomotive by receiving coils ahead of the first axle of the train. The shunting of the track by the first axle and wheels serves as a means for completing a track circuit so that this train alone receives the control pulses. The shunting of the track rails also prevents these pulses from feeding through to the next following train that may have entered the same block, and thus restricts the movement of the next following train. Under conditions where there are no track rails to be shunted, as on a monorail railroad, or where the shunt cannot be relied upon, this conventional type track circuit for transmitting the continuous pulses cannot be employed.

The vehicle indication system according to the present invention is particularly useful because it does not rely upon a track shunt, and can, therefore, be employed for continuous vehicle control and/or the indication of cab signals for a monorail railroad, or for the control and indication of lightweight cars such as empty mining cars, for example, and the like. The system provided by the present invention may also be used for the control of vehicles on any well defined right of way, such as on a superhighway or a thruway or for vehicles on an aircraft runway.

Generally speaking and without attempting to define the scope of the present invention this system provides that a right of way is divided into a series of adjoining zones or blocks. Each of the zones comprises a main loop circuit extending adjacent the right of way and disposed to be inductively coupled with vehicle-carried receiving apparatus. The main loop is selectively energized with modulated carrier frequency current whose carrier frequency is selected by the identity of the vehicle itself. The modulation of this carrier frequency is determined, by way of example, by the occupancy condition of the zone ahead of the one into which a vehicle is entering. Where it is desirable to indicate the occupancy condition of the pathway several zones ahead, for example, this may readily be accomplished by an extension of the circuits.

Wayside coils are provided at the adjoining ends of each zone for coupling inductively with inert tuned coils carried by the vehicles passing along the right of way. These coils are connected to a sweep frequency oscillating source of energy, so that whenever an inert coil becomes inductively coupled with the activated wayside coil, a particular frequency to which the inert coil is tuned will produce a discontinuity in the sweep frequency oscillation and thus provide a means for identifying the particular vehicle traveling over this location. Since this scheme is used at each end of every zone it is effective to provide a check-in and check-out accounting for particularly identified vehicles. In this system wherein a particularly identified vehicle is checked into a zone it will receive its control indications over its own particular carrier frequency. In instances where a second vehicle enters the same zone which has a different identification it would normally receive its own carrier frequency code if the zone were empty, however, in this system only the first vehicle continues to receive its code throughout the remainder of its passage through the zone. After the first vehicle checks out of the zone, however, the system, having been conditioned for the carrier frequency of the second train, then becomes effective to transmit the selected modulated carrier frequency to the second vehicle.

In any other instance when two vehicles of the same identity occupy the same zone, the modulated carrier signal is cancelled to both vehicles but upon the check-out from the zone of the first vehicle the transmitted signal is initiated to the second vehicle although it carried the same identity as the first vehicle.

In view of the above, one object of this invention is to provide a system for the reception of continuous indications of the occupancy condition of the pathway ahead to selectively identified vehicles traveling along a defined pathway.

Another object of this invention is to provide distinctive indications to moving vehicles by the method of selective carrier frequencies having selective modulation.

Another object is to provide a system for selectively applying indications to respectively identified vehicles at any time when only one vehicle is present within a zone and to cancel all indications when another vehicle having the same identity as the first registers into the same zone.

A further object is to provide a system for receiving indications on a following identified vehicle when this vehicle is present alone within a zone although all indications were formerly cancelled because of the entrance of more than one vehilce of the same identity into this zone.

A still further object is to provide a system for continually receiving indications on a first identified vehicle which enters a zone, although a second identified vehicle also enters the same zone, but after the first vehicle leaves the zone, the second vehicle receives its characteristic indication.

Other objects, purposes and characteristic features of the present invention will be in part obvious from the accompanying drawings and in part pointed out as the description of the invention progresses.

In describing the invention in detail, reference will be made to the accompanying drawings in which like reference characters are used to indicate parts having similar characteristics and functions and in which:

FIGS. 2A and 2B illustrate diagrammatically and schematically the wayside apparatus and circuits of a system in accordance with one embodiment of the invention.

The illustrations employed in the disclosure of the present invention have been arranged to facilitate an understanding of the invention as to its mode of operation and the principles involved rather than for the purpose of illustrating the construction and arrangement of parts that would be employed in practice. The relays and their contacts are shown in a conventional manner and conventional symbols are used within the schematic diagram. The symbols (+) and (−) have been used to identify positive and negative terminals respectively of a suitable battery, or other source of direct current. The frequencies designated as $f1$ through $f4$ used as carrier frequencies in the embodiment of this invention are typical of those within the low frequency audible band, for example, they may range from approximately twenty to several hundred cycles.

Figure 1:
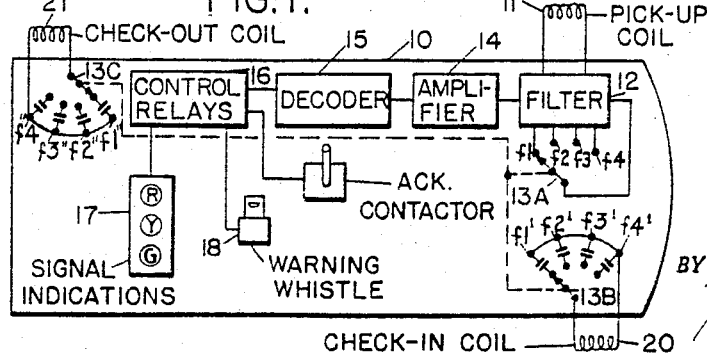
FIG. 1 illustrates schematically and in block form the vehicle carried apparatus in accordance with one embodiment of this invention.

With reference to FIG. 1 a vehicle 10 is illustrated having apparatus for the reception of the above mentioned carrier frequency. The pick up coil 11 inductively couples to a wayside conductor so that its received energy flows into the filter 12 through which it is passed in accordance with the selection of the setting of the selection switch 13A to any one of the four frequencies $f1$ through $f4$. An amplifier 14, having band-pass characteristics sufficiently broad to accept any one of the selected frequencies, amplifies the selected received signal for passage into a decoder 15. The decoder 15 substantially selects any one or a combination of control relays 16 in accordance with an interruption rate which is applied to the carrier frequency. The control relays 16 upon being selected are effective to select any one of the indications included within the signal indication 17. The rate at which the carrier frequencies are interrupted may possibly also cause the decoder 15 to select other control relays 16 or combinations thereof in order to actuate a warning whistle 18.

An inert coil 20 is capable of being selectively tuned by switch section 13B to any one of four corresponding but not necessarily the same frequencies, for example $f1'$, which corresponds to $f1$ as selected by the switch 13A. The coil 20 is used in conjunction with any one of the four different tuning capacitances to act as an inert influencing device for the intermittently located coils along the pathway over which it is passing.

Another coil, such as 21, connected to a switch section 13C by which it is selectively tuned to another or the same group of frequencies, such as $f1''$ for example, is also used to influence other selective intermittently located inductive devices along the pathway over which the vehicle passes. The switches 13A, 13B, and 13C are mechanically commonly connected so that the filter 12 and the coils 20 and 21 are all simultaneously tuned to corresponding frequencies such as $f1$, $f1'$ and $f1''$ for example. It will be noted that the coils 11, 20 and 21 each are positioned on their respective longitudinal axis so that each will be effective to inductively couple with its associated conductor or inductor placed along the pathway and to prevent interference from existing from one to another.

Figure 2A:
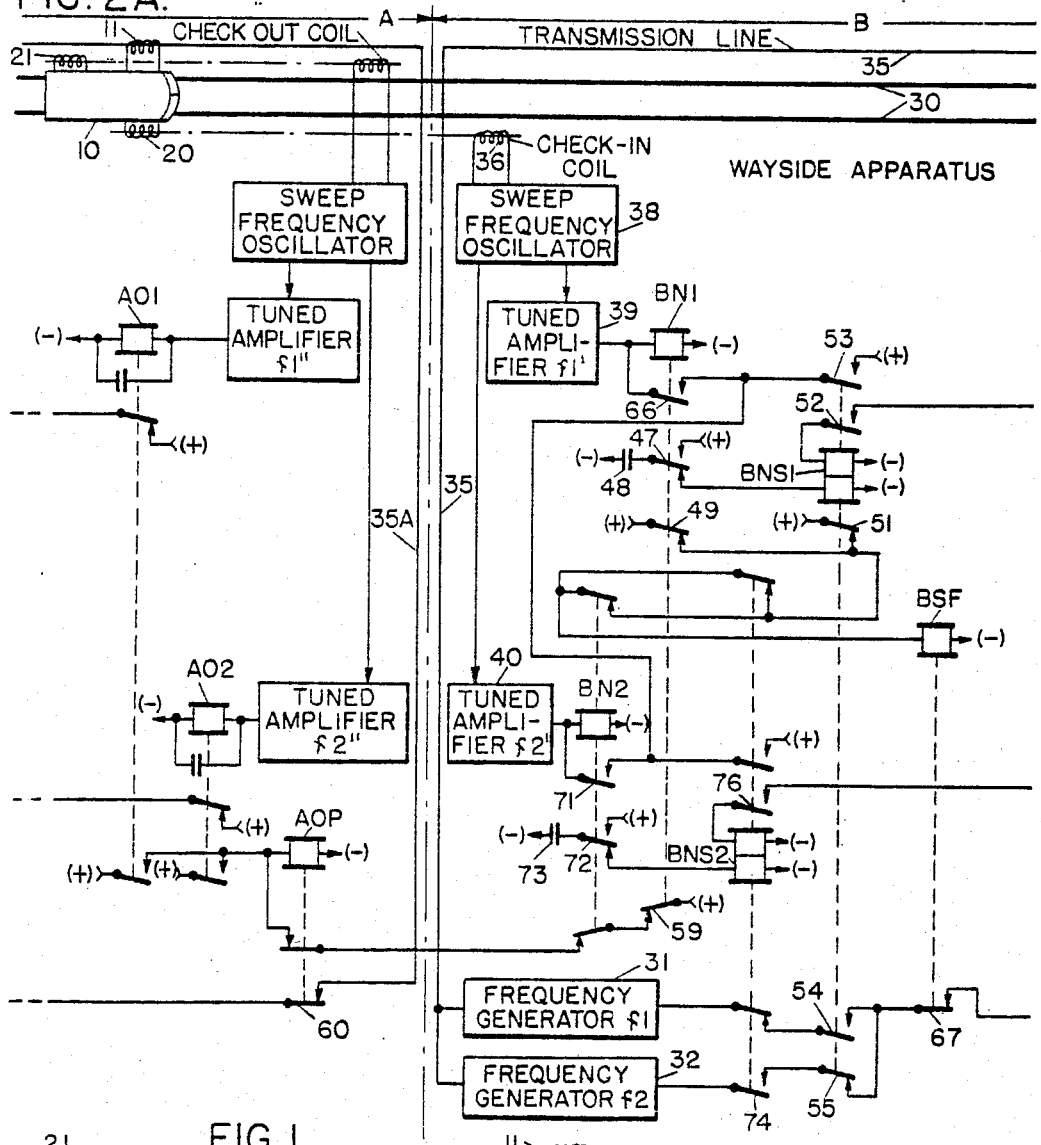

In the schematic diagram of FIGS. 2A and 2B a definite pathway for vehicles is illustrated by the trackway 30. This pathway 30 may be divided into zones such as A, B, and C and each zone has a complete set of wayside apparatus such as illustrated in zone B. For simplicity of illustration only a portion of the apparatus is shown in sections A and C. Each of the zones includes a number of frequency generators such as 31 and 32 for the frequencies $f1$ and $f2$ respectively. Additional frequency generators for $f3$ and $f4$ are not shown to simplify the illustration. Each of the frequency generators is connected to a loop conductor 35 which is placed adjacent to the pathway 30 so that a vehicle such as 10 moves along the pathway its pick-up coil 11 will be inductively coupled to the conductor 35. At the entrance point to each zone a check-in coil 36 is located and at the exit point a check-out coil 37 is disposed in proper inductive relationship to the axis of check-in coil 20 and check-out coil 21 respectively which are mounted on the vehicle 10. The check-in and check-out coils 36 and 37 are each connected to a sweep frequency oscillator 38, which may be of the type described in U.S. Patent 2,817,012, to which reference may be made for a more detailed description thereof. The sweep frequency oscillator 38, in turn, is connected to a number of tuned amplifiers, such as 39 and 40, each of which selectively amplifies its respective frequency such as $f1'$ or $f2'$. The relays BN1 and BO1 are energized whenever a discontinuity occurs at the frequency $f1'$ or $f1''$ in the sweep frequency oscillator 38. The tuned amplifiers 39 and 40 represent a number of units in series which are effective to energize a relay at a particular frequency input. As described in the aforementioned Patent 2,817,012 these blocks include a resonanat unit and detector, a gated amplifier, a cathode follower, a pulse stretcher amplifier and a rectifier. The relays, such as BN1 in this instance, may be thought of as the channel repeater relay C1P in the Kendall patent since it has a stick circuit associated with it. Relays such as BO1, on the other hand, may be thought of as the channel relay C1, for example, since it is intended merely for momentary energization. For this reason a capacitor 45 is connected across the relay BO1, and the capacitor 46 is connected across the relay BO2 in order to perform an operation equivalent to the C relay of the Kendall application. The relays BN1 and BN2 are, therefore, selectively energized whenever a vehicle checks into a zone in accordance with the identifying frequency as selected by the operator of the vehicle. In a similar manner the relays BO1 and BO2 are selectively energized at check-out time in accordance with the identification of the vehicle.

The relays BNS1 and BNS2 are used for maintaining a particular frequency on the transmitting or loop circuit in accordance with the identified frequency of the check-in vehicle. The contacts of these relays are interlocked so that only one frequency at any one time is available to the transmitting circuit. Other contacts on these relays are used to determine the interruption rate of the carrier frequency. The interruption rate relays such as 75CT and 180CT are shown in FIG. 2B and are associated within zone B, however, the contacts which energize these relays appear in zone C below the CNS1 and the CNS2 relays. In this manner the occupancy of the next forward zone is reflected back into the immediate adjacent zone so that an indication of the occupancy of the pathway ahead may be obtained.

For a second following train having the same frequency as a preceding train a relay such as BSF is used in zone B to indicate such an event. This relay is normally maintained energized. However, it will be released whenever two vehicles having the same identity appear within the same zone simultaneously. Such an event will open the normally closed front contact of this relay and cancel the transmission of carrier signal to both vehicles.

Another normally energized relay such as BOP also having a normally closed front contact in the transmitting circuit loop is used in conjunction with the check-out apparatus. When the system is first energized the relays such as AOP and BOP must initially be picked up so that they will be retained in this condition in order to close their respective transmitting loop circuits.

*Detailed operation*

When a vehicle 10 enters zone B, for example, its inert tuned coil 20 comes into inductive relationship with coil 36. This action causes a discontinuity in the sweep frequency of the oscillator 38 at a point determined by the frequency 1 of the selector switch 13. Let us assume the selector switch 13 is set to tune the coil 20 to a frequency $f1'$ then the interruption in the sweep frequency will occur at this carrier frequency $f1$ and, consequently, the tuned amplifier 39 which also operates at the same frequency will be effected. The activation of this tuned amplifier 39 is effective to energize the BN1 relay through an obvious circuit. Front contact 47 on the BN1 relay will close to a positive potential and charge the capacitor 48. At this time the opening of back contact 49 will be ineffective to drop out the BSF relay since it is also held energized by a parallel back contact 51 on the BNS1 relay. At the same time back contact 59 of the BN1 relay opens, thereby dropping out the AOP relay by an obvious circuit. The drop out of the AOP relay opens its front contact 60 which opens the transmitting loop circuit 35A in zone A; consequently causing the transmission of energy with this loop to cease.

A short time after the BN1 relay becomes energized it will drop out due to the passage of the vehicle beyond a point within zone B where the inductive relationship between coils 20 and 36 is no longer effective. When this occurs, back contact 47 closes and the charge on capacitor 48 is effective to pick up the BNS1 relay through its lower winding. Now that the BN1 relay has returned to its deenergized condition, back contacts 49 and 59 are closed conditioning these respective circuits for another series of events. Upon energizing the BNS1 relay, back contact 51 opens, however, since back contact 49 just formerly closed there is no change in the energized condition of the BSF relay.

When BNS1 is picked up, front contact 52 closes which is effective to maintain the BNS1 relay in an energized condition through an obvious circuit. At the same time front contact 53 closes which conditions a stick circuit for either the BN1 or the BN2 relay. At the same time front contact 54 closes and back contact 55 opens, the closing of the former completing the transmission circuit for the transmission of a carrier frequency $f1$, inasmuch as the frequency generator 31 is connected to this front contact 54 by an obvious circuit. Consequently, as soon as the vehicle passes to a point within zone B so that the inductive relationship between coils 20 and 36 is ineffective, then transmission will occur through the transmission line 35. When this line becomes energized the pickup coil 11 being axially located nearby this line will receive energy therefrom.

Assuming that zone C is vacant, neither of the relays CNS1 nor CNS2 will be energized, for they are similar to the BNS1 and BNS2 relays which become energized upon the entrance of a vehicle into the respective zone. Since the CNS1 and the CNS2 relay are both deenergized back contacts 56 and 57 (FIG. 2B) are closed and as a result the 180CT relay is energized by an obvious circuit. Its contact 58 is shown as a dashed line in the picked up position which indicates that this relay is an oscillating type. The designation 180 associated with this relay indicates that it oscillates at a rate of 180 cycles per minute, consequently the contact 58 interrupts the transmitting circuit of zone B at a rate of 180 cycles per minute. Thus, the carrier frequency $f1$ is modulated at the rate of 180 cycles per minute and since this interrupted energy is picked up by the coil 11 on the vehicle, the decoder 15 will select a combination of control relays 16 in accordance with this interrupted rate. Since zone C is now unoccupied the selection of the 180 cycle frequency gives an indication of this unoccupied zone, consequently, control relays 16 are influenced to select a clear or green signal indication for the operator.

As the vehicle travels through zone B, coil 11 remains in inductive relationship to the conductor 35 throughout the zone, consequently, the clear indication is continuously being received by the vehicle as long as zone C remains unoccupied.

Before vehicle 10 exits from zone B the front end will enter zone C and coil 20 will come into close proximity to coil 36C and, as a result, a check-in will occur in this new zone just as it did within zone B. As a result of this check-in, back contact 61 opens because the relay CN1 becomes momentarily energized during the check-in operation just as the relay BN1 became momentarily energized heretofore. This action is effective to deenergize the BOP relay by opening its obvious stick circuit a short time thereafter as the vehicle progresses. The rear mounted coil 21 comes into inductive relationship to the check-out coil 37 and thereby influences the sweep frequency oscillator 38. As a result, the BO1 relay becomes energized and its front contact 62 is effective to reenergize the BOP relay. Its stick circuit again becomes closed through its own front contact 63 and back contact 61 which is now closed because the relay CN1 also is only momentarily energized, as the vehicle now has progressed considerably beyond the point where the coil 20 and 36C are in inductive relationship. Thus, front contact 64 of the BOP relay is momentarily opened to stop the transmission of the carrier frequency $f1$ within the transmitting wire 35 and shortly thereafter this same front contact recloses in order to prepare the transmitting wire 35 for the entrance of the next following vehicle.

The following describes the operation of the system insofar as it provides for the cancellation of all indications when more than one vehicle conditioned to receive the same frequency registers into any particular zone. For the purpose of illustrating this operation let us assume that vehicle 10 is near the exit end of zone B but has not yet begun to enter zone C. Under this situation the BNS1 relay will be retained energized through its stick circuit. The 180CT relay will be oscillating at the 180 cycle per minute rate inasmuch as zone C is clear. All other relays within zone B are either energized or deenergized as indicated in the drawings of FIGS. 2A and 2B.

In order to cover this situation a second vehicle is adjusted to the same frequency as the first by having its switch 13A set to the $f1$ position thereby having the same identity as the first. When this second train then enters zone B along with the first train, the check-in coil 20 will come into inductive relationship with the wayside check-in coil 36. In so doing the sweep frequency oscillator 38 will be effected so that the tuned amplifier 39 will respond to its particular frequency $f1'$ and energize the BN1 relay. The closure of front contact 66 on this relay completes a stick circuit to it, because at this time front contact 53 on the BNS1 relay is also closed. At the same time back contact 49 on the BN1 relay also opens, thereby removing energy from the BSF relay, because at this time back contact 51 of the BNS1 is also opened. The drop out of the BSF relay causes the opening of its front contact 67 which, in turn, opens the transmitting loop circuit 35. Thus, by this action neither of the vehicles within zone B will receive transmitted energy. When this occurs the signal indication 17 may be arranged to be most restrictive or red on both vehicles and as a result both operators should reduce speed being prepared to stop on sight of an obstruction. As the first vehicle progresses it will soon follow the sequence as outlined before wherein it was mentioned how a vehicle will check into the next zone ahead and a short time thereafter check out of the immediate zone.

When the check-out occurs, the BO1 relay becomes energized and back contact 68 opens thereby causing the deenergization of the BNS1 relay. This, in turn, closes back contact 51 and reapplies energy to the BSF relay which now becomes reenergized and thus by the closure of front contact 67 prepares the transmitting circuit for continuity.

Heretofore when the BN1 relay became energized the capacitor 48, was charged. Now that its stick circuit releases this relay, the charge on the capacitor is effective through back contact 47 to reenergize the BNS1 relay. This action opens back contact 51, however, the BSF relay at this time is maintained energized through back contact 49 of the BN1 relay which is now closed. The energization of the BNS1 relay also closes its front contact 54 and, consequently, the transmitting loop circuit 35 is now completed. Thus, the frequency generator 31 is again effective to transmit a code through loop 35 so that the second vehicle which entered zone B will have its indication signal 17 reinstated. Under these circumstances this signal would be somewhat restrictive or yellow because of the occupancy of zone C ahead. Heretofore, the interruption rate within zone B, was 180 cycles per minute because back contacts 56 and 57 were both closed. At this time, however, when the first vehicle 10 has checked into zone C the CNS1 relay will become energized and stuck in a similar manner as the BNS1 relay. This causes contact 56 to change from back to front and thereby applies positive energy to the 75CT relay in zone B. Thus, contact 69 on the 75CT relay will cause an interruption in the oscillating transmitting circuit at a rate of 75 cycles per minute. When this coding rate is decoded by the decoder 15 within the second vehicle 10 it will be effective to cause a yellow signal indication or some other, such as red over yellow, which is sometimes used to restrict the forward motion of vehicles.

The following describes the operation of the system with respect to two vehicles having different identities existing within the same zone. In this example, let us consider that the identity of the second vehicle will be f2 since this vehicle is to have a different identity than the first vehicle. In this instance the frequency selector switch 13A must be set to the f2 position, and the other sections 13B and 13C will automatically be set to their corresponding frequencies f2' and f2'' rsepectively.

As before, when the first vehicle 10 stands within zone B somewhere near the exit end, the BNS1 relay will be maintained energized. Assuming zone C to be unoccupied at this time the 180CT relay will be oscillating at the 180 cycle per minute rate. All other relays shown within zone B are in the positions as indicated. When the second vehicle 10 checks into zone B it will be effective through the sweep frequency oscillator 38 to energize the tuned amplifier 40 so as to select the BN2 relay. This relay becomes stuck through its own front contact 71 because it is connected to positive potential through front contact 53 on the BNS1 relay which is now energized. At the same time front contact 72 closes and charges the capacitor 73. No further action will occur at this time because the BN2 relay is stuck in its energized position. Thus, the first vehicle 10 will continue to receive its 180 cycles per minute interrupted signal at a carrier frequency of f1 and the second vehicle will be unable to receive a signal because it is tuned to a carrier frequency of f2 which is turned off at this time because front contact 74 remains open.

When the first vehicle 10 checks out of zone B, back contact 68 on the BO1 relay will open and release the stick energy from the BNS1 relay, thereby opening front contact 53 and closing back contact 55, the latter in preparation to close the transmitting loop circuit for the carrier frequency f2. The release of the BNS1 relay is effective to remove the stick energy from the BN2 relay thereby closing back contact 72 and energizing the BNS2 relay from the charge accumulated on the capacitor 73. The energizing of the BNS2 relay closes its stick circuit through front contact 76. The selection of this relay closes its front contact 74 thereby completing the connection of the generator 32 to the transmitting loop circuit 35. In the meantime the check-in of the first vehicle 10 into zone C again causes the selection of the 75CT relay through front contact 56. However no energy is transmitted by wire 35 due to BOP front contact 64 being open. When the first vehicle checks out BOP is again energized and f2 energy is transmitted. Thus the second vehicle does not receive a signal until the first mitting circuit 35 having a carrier frequency f2 will be interrupted at a 75 cycle per minute rate in zone B and the pick-up coil 11 on the second vehicle 10 will be effective to receive this energy so as to cause its signal indicator 17 to show a lesser restrictive indication.

In summary, this invention provides a system for checking-in and checking-out an identified vehicle from each zone along a definite pathway over which the vehicles are traveling. When a check-in occurs a continuous signal is emitted within the check-in zone to provide a continuous signal indication for the operator of the vehicle. When a check-out occurs the exiting of the vehicle permits the exited zone to become quiescent ready to accommodate the entrance of the next following vehicle. A check-in occurs at the entrance to a zone before the check-out from the immediate zone. When a vehicle checks into the next zone it receives a continuous signal associated with this zone provided it is not restricted by any of the aforementioned circumstances. The entrance of a second vehicle of the same identity as the first vehicle into any one zone causes the continuous signal to be cancelled for both vehicles, but when the first vehicle exits from the zone the proper identity of signal is reinstated for the second vehicle. The entrance of a second vehicle of a different identity than that of the first vehicle into any one zone allows the signal for the first vehicle to remain, but prevents a signal for the second vehicle from being applied to the line 35 until the first vehicle has check-out of the zone. Since this scheme is not confined to the usual double track railroad, it may be readily adapted to a monorail railroad, thruway for vehicular traffic, or to a runway for aircraft traffic.

Having thus described this vehicle-carried indication system including vehicle identity as one embodiment of the present invention, it is to be understood that other forms of the invention may be employed in accordance with the requirements of practice and that adaptations, alterations and modifications may be applied to the specific forms shown in accordance with the invention as defined by the appended claims.

What I claim is:

1. A system for indicating the presence of vehicles in predetermined zones along a right of way comprising:
    (a) receiving means disposed on each vehicle selectively adjusted to a predetermined carrier frequency in accordance with the identity of said vehicle,
    (b) first means disposed within said predetermined zones for emitting a selected one of a plurality of carrier frequencies, corresponding to the identity of the vehicle,
    (c) initiating means disposed at the entrance end of each zone for initiating the emission of a first selected carrier frequency signal when a first vehicle of one identity enters said zone and for conditioning a second selected carrier frequency signal when a vehicle of another identity enters said zone,
    (d) means responsive to the entrance into said zone of a second vehicle of said one identity to eliminate the initiated signal when said first vehicle is in said zone,
    (e) means disposed at the exit end of each zone for starting said initiating means when said first vehicle exits said zone, to emit the selected carrier frequency signal corresponding to the identity of the second vehicle in the zone, and
    (f) means responsive to the occupancy condition of the zone ahead of said zone to selectively code the selected carried frequency signal.

2. A system for indicating the presence of vehicles in predetermined zones along a right of way comprising:
    (a) means for detecting the entrance and identity of a vehicle into said zones,
    (b) means for detecting the exiting of an identified vehicle from said zones,
    (c) transmitting means within each zone for transmitting a distinctive frequency output in accordance with the identity of each vehicle as detected by said detecting and identification means, (d) receiving means carried by each vehicle adapted to inductively couple to said transmitting means after said vehicle enters said zone, (e) first circuit means operative to render the said transmitting means in operative upon the entrance of a second vehicle having the same identity as said first vehicle which entered the zone, and (f) second circuit means effective to render the said transmitting means operative upon the detection by said exit detection means of the leaving of said first vehicle from the zone.

3. A system for indicating the presence of vehicles in predetermined zones along a right of way comprising:

(a) a plurality of frequency generators within each zone for generating a carrier frequency signal indicative of the identity of each vehicle, (b) loop circuit means associated with each zone adjacent said right of way and connected to said generators for transmitting said generated signal within each zone, (c) entrance detection means effective to identify vehicles upon entering a zone, (d) exit detection means effective to identify vehicles upon exiting a zone, (e) identification means disposed on each vehicle tuned to a distinctive frequency and inductively coupled to said loop circuit means effective to select a particular one of said generators upon the energization of said entrance detection means by the passage of a vehicle thereover, (f) first circuit means operative to store the detected entrance of a second differently identified vehicle entering said zone, and (g) second circuit means effective to establish in said loop circuit means the frequency of said second entering vehicle upon the exiting of said first vehicle from the zone.

4. A system for indicating the occupancy of vehicles in predetermined zones along a right of way comprising, (a) check-in means including an inductive pick-up loop disposed at the entrance to each zone for registering the identity of a vehicle entering a zone, (b) check-out means including an inductive pick-up loop disposed at the exit end of each zone for registering the identity of a vehicle leaving a zone, (c) transmitting means including a multiple frequency generator connected to a conductor disposed adjacent said right of way within each said zone for transmitting a selected frequency in accordance with the registered identity from said check-in means, (d) indication means disposed on each vehicle for indicating the occupancy condition of said right of way, (e) receiving means including said indication means inductively coupled to said conductor for amplifying a selected frequency in accordance with the identity of said vehicle and registering an indication from said amplified frequency, (f) a pair of resonant circuit means disposed on the vehicle, one at times disposed to be in inductive relationship to said check-in means and the other at times disposed to be in inductive relationship to said check-out means for selecting a frequency of identification for said vehicle and for activating said check-in means and said check-out means respectively whenever operatively inductively coupled thereto, and (g) modulation means governed by the occupancy condition of the zone in advance of said vehicle for modulating the frequency of said transmitting means effective to indicate on said receiving means said occupancy condition.

5. A system according to claim 4 wherein said check-in means is effective to render said transmitting means inoperative when a second vehicle having the same identity as a first vehicle enters said zone prior to the activation of said check-out means by said first vehicle to place said indication means in a most restrictive condition.

6. A system according to claim 4 wherein said check-in means is effective to store the entrance of a second vehicle having a different identity than a first vehicle until said first vehicle activates said check-out means whereupon said transmitting means is activated with an identification frequency corresponding to said second vehicle to register the occupancy condition of the zone ahead on said indication means.

7. A system according to claim 4 wherein said check-in means includes a frequency selective amplifier connected thereto effective to select and activate one particular frequency generator in said transmitting means upon the activation of said check-in means by a vehicle having the same frequency identity as said selected generator.

8. A system according to claim 7 wherein said check-out means includes a frequency selective amplifier connected thereto effective to select and deactivate the activated frequency generator in said transmitting means upon the activation of said check-out means by the passage of an identified vehicle from said zone.

9. A system for governing the passage of vehicles along a right of way without track circuits divided into successive zones, comprising (a) a first means disposed adjacent the right of way to detect a vehicle entering each zone, (b) a second means disposed adjacent the right of way to detect a vehicle leaving each zone, (c) loop circuit means for the successive zones extending along the right of way for transmitting at times selected codes to vehicles within the associated zone, (d) means on each vehicle to receive the selected code, (e) first circuit means responsive to the detection of a first vehicle by one of the first means to activate the loop circuit means to transmit a code for its associated zone, (f) second circuit means responsive to the detection of a second vehicle by said same first means when the first vehicle is occupying said zone operative to render the loop circuit means inoperative to transmit its code, (g) means responsive to the second means detecting the first vehicle leaving said zone to render the loop circuit means operative to transmit its code, and (h) means on each vehicle to govern the vehicle to a most restrictive operation in the absence of a reception of a code.

10. A system for governing the passage of vehicles along a right of way without track circuits divided into successive zones, wherein each of a plurality of the vehicles is provided with means to influence a wayside means in a distinct manner to distinguish one vehicle from another comprising, (a) first means disposed adjacent the right of way distinctively influenced by the vehicle carried means as each vehicle enters a successive zone, (b) second means disposed adjacent the right of way distinctively influenced by the vehicle carried means as each vehicle leaves a successive zone, (c) receiving means on each of the plurality of vehicles operative to effectively receive a distinct signal corresponding to the distinct influence by its vehicle carried means, (d) loop circuit means for the successive zones extending along the right of way for transmitting at times a selected one of said distinct signals to vehicles within the associated zone, (e) first circuit means responsive to a distinctively influenced first means by one of the vehicles to activate the loop circuit means to transmit a distinct signal, (f) second circuit means responsive to a distinctively influenced first means by another of said plurality of vehicles to store the detected entrance of said other vehicle when the loop circuit is activated, (g) means responsive to a distinctively influenced second means by said one vehicle to activate the loop circuit means with a distinct signal corresponding to the second vehicle in said zone, and (h) means on each vehicle to govern it to its most restrictive operation in the absence of the reception of a transmitted signal from the loop circuit means.

11. A system as claimed in claim 10 further including circuit means responsive to the influenced first means by a second vehicle in a manner indistinct from a first vehicle when the first vehicle is occupying the associated zone to deactivate the loop circuit means.

References Cited by the Examiner

UNITED STATES PATENTS

| 2,252,525 | 8/1941 | Reid et al. | 246—30 X |
| 2,607,000 | 8/1952 | Mayle | 246—30 |
| 2,753,550 | 7/1956 | Treharne. | |
| 2,817,012 | 12/1957 | Kendall. | |
| 2,828,480 | 3/1958 | Golladay. | |
| 3,041,448 | 6/1962 | Pascoe et al. | 246—63 |
| 3,045,112 | 7/1962 | Hailes | 246—63 |
| 3,112,908 | 12/1963 | Hailes | 246—34 X |

ARTHUR L. LA POINT, *Primary Examiner.*

JAMES S. SHANK, *Examiner.*

S. B. GREEN, *Assistant Examiner.*